(12) United States Patent
Soga (10) Patent No.: US 10,387,532 B2
(45) Date of Patent: Aug. 20, 2019

(54) MANUFACTURING CONTROL SYSTEM, MANUFACTURING CONTROL METHOD, AND MANUFACTURING CONTROL PROGRAM

(71) Applicant: Kabushiki Kaisha Toshiba, Tokyo (JP)

(72) Inventor: Akira Soga, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1346 days.

(21) Appl. No.: 13/835,246

(22) Filed: Mar. 15, 2013

(65) Prior Publication Data
US 2014/0088903 A1    Mar. 27, 2014

(30) Foreign Application Priority Data
Sep. 21, 2012   (JP) .................. 2012-208399

(51) Int. Cl.
*G06F 17/00* (2019.01)
*G05B 19/418* (2006.01)
*G07C 3/14* (2006.01)

(52) U.S. Cl.
CPC ....... *G06F 17/00* (2013.01); *G05B 19/41875* (2013.01); *G07C 3/146* (2013.01);
(Continued)

(58) Field of Classification Search
CPC ............ G07C 3/146; G05B 19/41875; G05B 2219/32196; G05B 2219/32197; G05B 2219/32203; G06F 17/00; Y02P 90/22
(Continued)

(56) References Cited

U.S. PATENT DOCUMENTS

| 2005/0159835 A1 | 7/2005 | Yamada et al. |
| 2007/0016322 A1 | 1/2007 | Kataoka |
| 2008/0098007 A1 | 4/2008 | Nakamura |

FOREIGN PATENT DOCUMENTS

| CN | 1655325 A | 8/2005 |
| CN | 1938659 A | 3/2007 |

(Continued)

OTHER PUBLICATIONS

Combined Chinese Office Action and Search Report dated Apr. 15, 2016 in Patent Application No. 201310392115.5 (with English language translation).

(Continued)

*Primary Examiner* — Yoshihisa Ishizuka
(74) *Attorney, Agent, or Firm* — Oblon, McClelland, Maier & Neustadt, L.L.P.

(57) ABSTRACT

According to one embodiment, a manufacturing control system includes a reference data creating unit, first, second and third data storing units, first, second and third data extracting units. The reference data creating unit creates reference data including a reference time related to a product. The first data storing unit stores data related to parts acceptance inspection and related to assembly of the product. The second data storing unit stores data related to inspection in manufacturing. The third data storing unit stores data related to quality assurance inspection and of acceptance inspection at a customer site. The first data extracting unit extracts data related to latest parts acceptance inspection and related to latest assembly of the product. The second data extracting unit extracts data related to inspection in latest manufacturing. The third data extracting unit extracts data related to latest quality assurance inspection and of latest acceptance inspection.

17 Claims, 4 Drawing Sheets

(52) U.S. Cl.
CPC ............... *G05B 2219/32196* (2013.01); *G05B 2219/32197* (2013.01); *G05B 2219/32203* (2013.01); *Y02P 90/22* (2015.11)

(58) Field of Classification Search
USPC .......................................................... 702/81
See application file for complete search history.

(56) References Cited

FOREIGN PATENT DOCUMENTS

| | | |
|---|---|---|
| CN | 102243733 A | 11/2011 |
| JP | 11-126222 | 5/1999 |
| JP | 2004-220588 | 8/2004 |
| JP | 2010-224988 A | 10/2010 |
| JP | 2011-107999 | 6/2011 |

OTHER PUBLICATIONS

Japanese Office Action dated Dec. 18, 2013, in Japan Patent Application No. 2012-208399 (with English translation).
Office Action dated Nov. 11, 2016 in Chinese Patent Application No. 201310392115.5 (with English language translation).

MANUFACTURING CONTROL SYSTEM, MANUFACTURING CONTROL METHOD, AND MANUFACTURING CONTROL PROGRAM

CROSS-REFERENCE TO RELATED APPLICATIONS

This application is based upon and claims the benefit of priority from the prior Japanese Patent Application No. 2012-208399, filed on Sep. 21, 2012; the entire contents of which are incorporated herein by reference.

FIELD

Embodiments described herein relate generally to a manufacturing control system, a manufacturing control method, and a manufacturing control program.

BACKGROUND

In manufacturing control of products, data are collected for each manufacturing process, and the collected data are aggregated by a human operator to create history data required for manufacturing control. This takes time to create history data, and may cause misaggregation due to human errors. Thus, a technique has been proposed for compiling all the process transition records for all products into a database to create history data based on the process transition records compiled in the database.

However, in such a technique, the database becomes enormous. Furthermore, all the processes are sequentially traced based on the process transition records. This requires more queries than the number of processes, and increases the load on the manufacturing control system. Furthermore, even if the data necessary for creating history data are data of a subset of the processes, all the processes need to be traced. This results in a low efficiency.

Thus, there is demand for a technique capable of performing high-efficiency and appropriate manufacturing control.

DETAILED DESCRIPTION

According to one embodiment, a manufacturing control system includes a reference data creating unit, a first data storing unit, a second data storing unit, a third data storing unit, a first data extracting unit, a second data extracting unit and a third data extracting unit. The reference data creating unit is configured to create, based on data for specifying a target product, reference data including a reference time related to the product. The first data storing unit is configured to store data related to parts acceptance inspection and data related to assembly of the product. The second data storing unit is configured to store data related to inspection in manufacturing of the product. The third data storing unit is configured to store data related to quality assurance inspection and data of acceptance inspection at a customer site. The first data extracting unit is configured to extract data related to latest of the parts acceptance inspection before N-th round of the reference time of the product and data related to latest of the assembly of the product from the data stored in the first data storing unit. The second data extracting unit is configured to extract data related to inspection in latest manufacturing of the product after (N−1)-th round of the reference time and before the N-th round of the reference time of the product from the data stored in the second data storing unit. The third data extracting unit is configured to extract data related to latest of the quality assurance inspection after the N-th round of the reference time and before (N+1)-th round of the reference time of the product and data of latest of the acceptance inspection at the customer site from the data stored in the third data storing unit.

Various embodiments will be described hereinafter with reference to the accompanying drawings. In the drawings, similar components are labeled with like reference numerals, and the detailed description thereof is omitted appropriately.

[First Embodiment]

Figure 1:
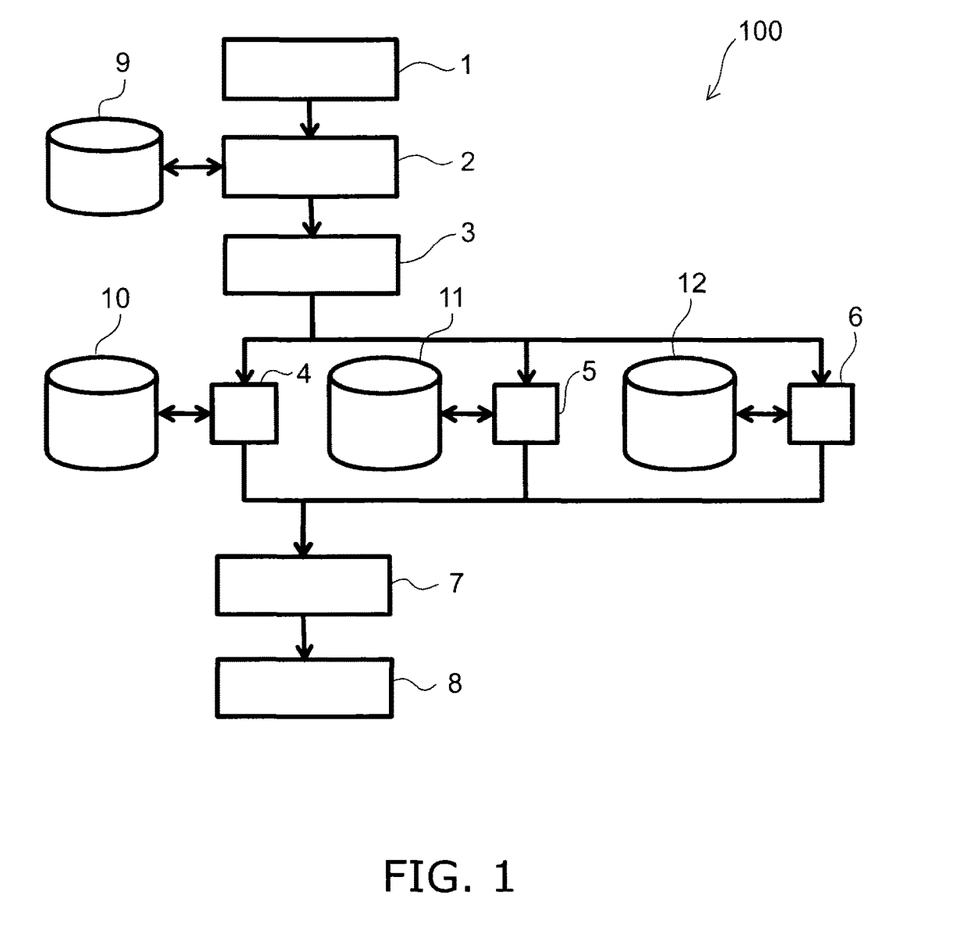
FIG. 1 is a block diagram for illustrating a manufacturing control system 100 according to a first embodiment.

FIG. 1 is a block diagram for illustrating a manufacturing control system 100 according to a first embodiment.

As shown in FIG. 1, the manufacturing control system 100 includes an input unit 1, a reference data creating unit 2, a reference data saving unit 3, a first data extracting unit 4, a second data extracting unit 5, a third data extracting unit 6, a history data creating unit 7, an output unit 8, a data storing unit 9, a first data storing unit 10, a second data storing unit 11, and a third data storing unit 12.

The input unit 1 is configured to input data for specifying a target product.

The data for specifying a target product are e.g. manufacturing serial numbers or shipping serial numbers.

The input unit 1 can be e.g. any of various data input devices such as a keyboard and barcode reader.

The input unit 1 provides the data for specifying a target product to the reference data creating unit 2.

The reference data creating unit 2 creates reference data based on the data for specifying a target product.

The reference data includes a reference time related to the target product. The reference time related to the target product is e.g. the end time of final inspection of the target product, or the shipping time of the target product. The reference time related to the target product can be used in forming each time band described later. The reference data can include the manufacturing serial number or shipping serial number of the target product.

The end time of final inspection of the target product can be extracted from the data stored in the data storing unit 9.

The final inspection can be e.g. one of final inspection in the manufacturing process, quality assurance inspection performed after the final inspection in the manufacturing process, and acceptance inspection at the customer site.

Thus, based on the data for specifying a target product, the reference data creating unit 2 creates reference data including a reference time related to the product.

Then, the reference data creating unit 2 provides the created reference data to the reference data saving unit 3.

The reference data saving unit 3 temporarily saves the created reference data.

Then, the reference data saving unit 3 provides the reference data to the first data extracting unit 4, the second data extracting unit 5, and the third data extracting unit 6.

Here, for one of the data for specifying a target product, the end time of final inspection or the shipping time, for instance, may exist in a plurality. For instance, in the case of FIG. 2 described later, there are three end times of final inspections (final inspections 1-3) in the manufacturing process.

Thus, the aforementioned reference data may include a plurality of reference times.

In the following description, the end times of final inspections are sequentially indexed by N=1, 2, 3, . . . , k from past to present, where N and k are natural numbers.

As an example, in the following description, it is assumed that the reference time is the end time of final inspection in the manufacturing process (hereinafter simply referred to as final inspection).

The first data extracting unit 4, the second data extracting unit 5, and the third data extracting unit 6 form respective time bands based on the reference data, and extract prescribed data in the respective time bands.

The first data extracting unit 4 extracts data related to the latest parts acceptance inspection before the end time of the N-th round of final inspection of the target product (first time band 51) and data related to the latest assembly of the product from the data stored in the first data storing unit 10.

In this case, data from the end time of the N-th round of final inspection back to a prescribed period (e.g., 10 years) before the end time of the initial final inspection 1 can be extracted.

The data stored in the first data storing unit 10 are e.g. data related to parts acceptance inspection and data related to assembly of the product. Examples of the data related to parts acceptance inspection can include the manufacturing date of the parts and the manufacturer's name of the parts. Examples of the data related to assembly of the product can include the assembly process name, parts lot number, assembly time, assembly apparatus, and operator's name.

That is, the first data extracting unit 4 forms a first time band 51 based on the reference data and extracts data related to the latest parts acceptance inspection in the first time band 51 and data related to the latest assembly of the product from the data stored in the first data storing unit 10.

The second data extracting unit 5 extracts data related to inspection in the latest manufacturing of the product after the end time of the (N−1)-th round of final inspection and before the end time of the N-th round of final inspection of the target product (second time band 52) from the data stored in the second data storing unit 11.

Here, when N is 1, N−1 is 0. Then, the latest data in a prescribed period (e.g., 10 years) before the end time of the initial final inspection 1 can be extracted.

The data stored in the second data extracting unit 5 are e.g. data related to inspection in the manufacturing of products. Examples of the data related to inspection in the manufacturing of products can include the inspection time, the pass/fail result, the content of abnormality, the inspection value, and the inspection apparatus name.

That is, the second data extracting unit 5 forms a second time band 52 based on the reference data and extracts data related to inspection in the latest manufacturing of the product in the second time band 52 from the data stored in the second data storing unit 11.

In a product made of a plurality of parts, even if every part passes inspection, the product assembled from the parts may fail inspection. In this case, the product may fail due to incompatibility between the parts. The failed product may include a usable part, and the part itself may be expensive.

Thus, the product failed in the inspection in the manufacturing process of the product may be repaired.

For instance, in the manufacturing of a product using an expensive part such as a hard disk drive (HDD), there is a greater demand for repairing the product failed in the inspection in the manufacturing process of the product.

Figure 2:
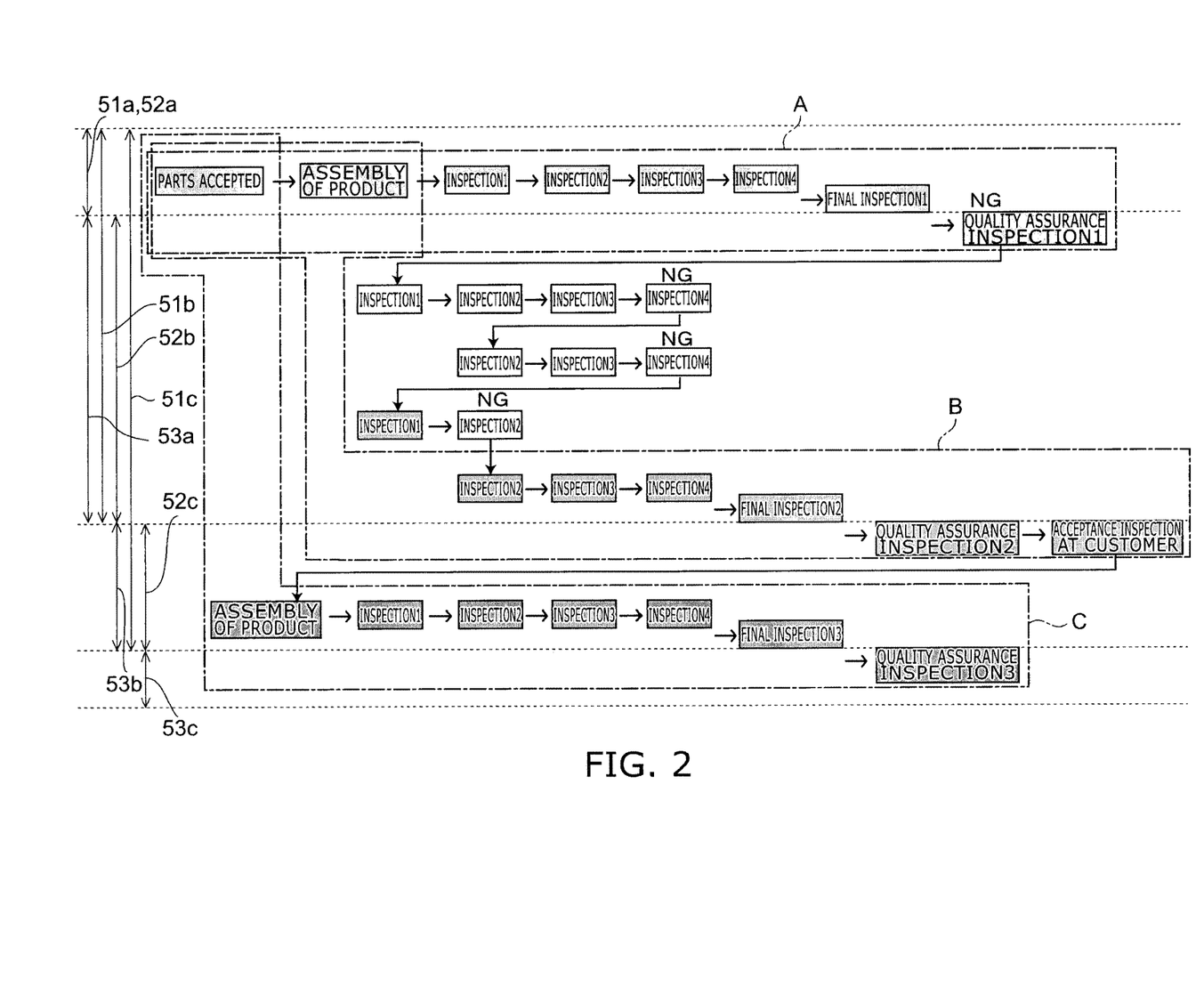
FIG. 2 is an inspection process diagram for illustrating the creation of history data.

Thus, in the manufacturing process of the product, as illustrated in FIG. 2, the same inspection may be performed a plurality of times.

In this case, all the process transition records for the products can be compiled into a database, and history data can be created based on the process transition records compiled in the database. However, the database becomes enormous.

Furthermore, all the processes are sequentially traced based on the process transition records. This requires more queries than the number of processes, and increases the load on the manufacturing control system. Furthermore, even if the data necessary for creating history data are data of a subset of the processes, all the processes need to be traced. This results in a low efficiency.

Thus, in the manufacturing control system according to the embodiment, a desired time band is formed based on the reference data, and the latest data in the formed time band are extracted.

Accordingly, high-efficiency and appropriate manufacturing control can be performed.

The third data extracting unit 6 extracts data related to the latest quality assurance inspection after the end time of the N-th round of final inspection and before the end time of the (N+1)-th round of final inspection of the target product (third time band 53), data of the latest acceptance inspection at the customer site, and data related to the latest return from the data stored in the third data storing unit 12.

In this case, if the (N+1)-th round of final inspection is not performed, for instance, the latest data in a prescribed period (e.g., 10 years) after the end time of the N-th round of final inspection of the target product can be extracted.

The data stored in the third data storing unit 12 are e.g. data related to quality assurance inspection, data of acceptance inspection at the customer site, and data related to return.

Examples of the data related to quality assurance inspection can include the inspection time, the pass/fail result, the content of abnormality, the inspection value, and the inspection apparatus name.

Examples of the data of acceptance inspection at the customer site can include the inspection time, the pass/fail result, the content of abnormality, the inspection value, the inspection apparatus name, and the customer's name.

The data related to return are data related to return of products having failed the acceptance inspection at the customer site. Examples of the data related to return can include the return receiving time, the content of trouble, and the product type.

That is, the third data extracting unit 6 forms a third time band 53 based on the reference data and extracts data related to the latest quality assurance inspection in the third time band 53, data of the latest acceptance inspection at the customer site, and data related to the latest return from the data stored in the third data storing unit 12.

Here, the data related to the latest return can be extracted as necessary.

The data extracted by the first data extracting unit 4 (data related to the latest parts acceptance inspection and data related to the latest assembly of the product), the data extracted by the second data extracting unit 5 (data related to inspection in the latest manufacturing of products), and the data extracted by the third data extracting unit 6 (data related to the latest quality assurance inspection, data of the latest acceptance inspection at the customer site, and data related to the latest return) are provided to the history data creating unit 7.

The history data creating unit 7 creates history data from at least one selected from the group consisting of the data extracted by the first data extracting unit 4, the data extracted by the second data extracting unit 5, and the data extracted by the third data extracting unit 6.

The details on the creation of history data will be described later.

The output unit 8 outputs the history data toward external devices.

The output unit 8 can be e.g. any of various data output devices such as a display device and printer.

The data storing unit 9 stores data required to create reference data. The data storing unit 9 stores e.g. data related to final inspection, data related to quality assurance inspection, data related to acceptance inspection at the customer site, and data related to the manufacturing serial number or shipping serial number of the product.

The first data storing unit 10 stores e.g. data related to parts acceptance inspection and data related to assembly of the product.

The second data storing unit 11 stores e.g. data related to inspection in the manufacturing of the product.

The third data storing unit 12 stores e.g. data related to quality assurance inspection, data of acceptance inspection at the customer site, and data related to return.

Next, the creation of history data is further illustrated.

FIG. 2 is an inspection process diagram for illustrating the creation of history data.

The diagram illustrated in FIG. 2 relates to the case of the following process.

In the manufacturing process, products were subjected to inspections 1-4. Subsequently, the products passed the first round of final inspection 1. However, the products failed the first round of quality assurance inspection 1. Then, in the manufacturing process, the products were repaired and subjected to inspections 1-4. Subsequently, the products passed the second round of final inspection 2 and the second round of quality assurance inspection 2, and were shipped. However, the products failed acceptance inspection at the customer site. Then, in the manufacturing process, the products were again repaired and subjected to inspections 1-4. Subsequently, the products passed the third round of final inspection 3 and the third round of quality assurance inspection 3.

In this case, the final inspection 1-3 is exhaustive inspection, and the quality assurance inspection 1-3 is sampling inspection.

The content of the inspections 1-4 can be arbitrary. The number of inspections is not limited to four, but can be changed appropriately.

Here, FIG. 2 shows the case of determining the first time band 51, the second time band 52, and the third time band 53 with reference to the end time of final inspection. However, the first to third time bands 51-53 can also be determined with reference to e.g. the end time or start time of quality assurance inspection, the end time or start time of acceptance inspection at the customer site, or the shipping time of the product.

The history data for A in FIG. 2 can be used to identify e.g. the cause of abnormality in the manufacturing process.

Thus, the history data for A in FIG. 2 can be utilized for operational improvement such as yield increase in the manufacturing process.

Use of statistical analysis to identify the cause of abnormality in the manufacturing process requires data including, in the raw proportion, data related to passing and data related to failing based on the cause of abnormality in the manufacturing process.

In this case, the history data for A in FIG. 2 includes, in the raw proportion, data related to passing and data related to failing based on the cause of abnormality in the manufacturing process. Thus, statistical analysis using the history data for A in FIG. 2 can identify the cause of abnormality in the manufacturing process. For instance, the cause of abnormality in the manufacturing process can be identified by e.g. correlation analysis between the mode of abnormality and the predetermined failure mode.

The history data for A in FIG. 2 can be determined from the data extracted by the first data extracting unit 4 in the first time band 51*a* for N equal to 1 (data related to the latest parts acceptance inspection and data related to the latest assembly of the product), the data extracted by the second data extracting unit 5 in the second time band 52*a* for N equal to 1 (data related to inspection in the latest manufacturing of the product), and the data extracted by the third data extracting unit 6 in the third time band 53*a* for N equal to 1 (data related to the latest quality assurance inspection).

The history data for B in FIG. 2 can be used to identify e.g. the range of other products affected by the cause of failing the acceptance inspection at the customer site. The history data for B in FIG. 2 are data immediately before shipment, and include the cause of failing the acceptance inspection at the customer site. Thus, statistical analysis, for instance, of the history data for B in FIG. 2 can identify the cause of failing the acceptance inspection at the customer site. For instance, the cause of failing the acceptance inspection at the customer site can be identified by e.g. correlation analysis between the mode of abnormality and the predetermined failure mode. As a result, pre-shipment products expected to fail the acceptance inspection at the customer site due to the same cause can be identified. That is, shipment of products likely to fail the acceptance inspection at the customer site can be stopped. Furthermore, it is also possible, for instance, to repair the products stopped before shipment, and to improve the inspection condition so as to avoid failing the acceptance inspection at the customer site.

The history data for B in FIG. 2 can be determined from the data extracted by the first data extracting unit 4 in the first time band 51*b* for N equal to 2 (data related to the latest parts acceptance inspection and data related to the latest assembly of the product), the data extracted by the second data extracting unit 5 in the second time band 52*b* for N equal to 2 (data related to inspection in the latest manufacturing of the product), and the data extracted by the third data extracting unit 6 in the third time band 53*b* for N equal to 2 (data related to the latest quality assurance inspection and data of the latest acceptance inspection at the customer site).

As shown in FIG. 2, each time the product fails inspection 1-4, the product is repaired. Then, the repaired product is again subjected to inspections 1-4 which the product previously failed. Thus, there may be a plurality of data related to inspections 1-4 and data related to quality assurance inspection having the same content. In this case, the repair of the product decreases the importance of the data related to inspections 1-4 and the data related to quality assurance inspection before the repair. On the other hand, analysis of all the data included therein leads to excessive effort and load required for extraction and analysis. Thus, in the embodiment, the second time band 52b and the third time band 53b are determined to determine data related to inspection in the latest manufacturing of the product and data of the latest acceptance inspection at the customer site.

In this case, data of inspections 1-4 other than the "data of the latest inspections 1-4 " in the second time band 52b can be used to determine the appropriateness of repair. For instance, if the condition or method of the repair is inappropriate, the same inspections 1-4 and repair are repeated. Thus, statistical analysis of the data of inspections 1-4 other than the "data of the latest inspections 1-4" in the second time band 52b can determine the appropriateness of repair. For instance, the appropriateness of repair can be identified by e.g. correlation analysis between the mode of abnormality and the predetermined failure mode.

The history data for C in FIG. 2 can be used in e.g. quality assurance for shipped products.

The history data for C in FIG. 2 are data immediately before shipment related to the products having passed the acceptance inspection at the customer site, or the products accepted as passed products. Thus, the history data for C in FIG. 2 need to be saved for quality assurance for the shipped products. Furthermore, if any trouble occurs at the customer site, the cause of the trouble at the customer site can be found by analyzing the history data for C in FIG. 2.

The history data for C in FIG. 2 can be determined from the data extracted by the first data extracting unit 4 in the first time band 51c for N equal to 3 (data related to the latest parts acceptance inspection and data related to the latest assembly of the product), the data extracted by the second data extracting unit 5 in the second time band 52c for N equal to 3 (data related to inspection in the latest manufacturing of the product), and the data extracted by the third data extracting unit 6 in the third time band 53c for N equal to 3 (data related to the latest quality assurance inspection).

Here, as an example, the data for A and the data for C in FIG. 2 are illustrated in the case where repetitive repair is not performed. However, also in this case, repetitive repair may be performed. In the case where repetitive repair is performed, there may be a plurality of data related to inspections 1-4 having the same content. Thus, in the case where repetitive repair is performed, the "data of the latest inspections 1-4" in the second time band 52a, 52c are used, respectively.

Furthermore, in the case where repetitive repair is performed, data of inspections 1-4 other than the "data of the latest inspections 1-4" can be used to determine the appropriateness of repair.

Next, the function of the manufacturing control system 100 is illustrated.

First, data for specifying a target product is inputted to the input unit 1.

The data for specifying a target product are e.g. manufacturing serial numbers or shipping serial numbers.

Next, the reference data creating unit 2 creates reference data based on the inputted data for specifying a target product.

The reference data includes e.g. the end time of final inspection of the target product, and the manufacturing serial number or shipping serial number of the target product.

The end time of final inspection of the target product is extracted from the data stored in the data storing unit 9.

Here, instead of the end time, the start time may be used.

Next, the reference data saving unit 3 temporarily saves the created reference data, and provides the reference data to the first data extracting unit 4, the second data extracting unit 5, and the third data extracting unit 6.

Next, the first data extracting unit 4, the second data extracting unit 5, and the third data extracting unit 6 extract prescribed data in the respective time bands based on the created reference data.

For instance, the first data extracting unit 4 extracts data related to the latest parts acceptance inspection before the end time of the N-th round of final inspection of the target product, and data related to the latest assembly of the product, from the data stored in the first data storing unit 10.

The second data extracting unit 5 extracts data related to inspection in the latest manufacturing of the product after the end time of the (N−1)-th round of final inspection and before the end time of the N-th round of final inspection of the target product from the data stored in the second data storing unit 11.

The third data extracting unit 6 extracts data related to the latest quality assurance inspection after the end time of the N-th round of final inspection and before the end time of the (N+1)-th round of final inspection of the target product, data of the latest acceptance inspection at the customer site, and data related to the latest return, from the data stored in the third data storing unit 12.

Next, the history data creating unit 7 creates history data from at least one selected from the group consisting of the data extracted by the first data extracting unit 4, the data extracted by the second data extracting unit 5, and the data extracted by the third data extracting unit 6.

Here, the creation of history data can be made similar to that described above, and hence the detailed description thereof is omitted.

Next, the output unit 8 outputs the created history data toward external devices.

The manufacturing control system 100 according to the embodiment can form a desired time band based on the reference data, and extract the latest data in the formed time band.

Thus, high-efficiency and appropriate manufacturing control can be performed.

[Second Embodiment]

Figure 3:
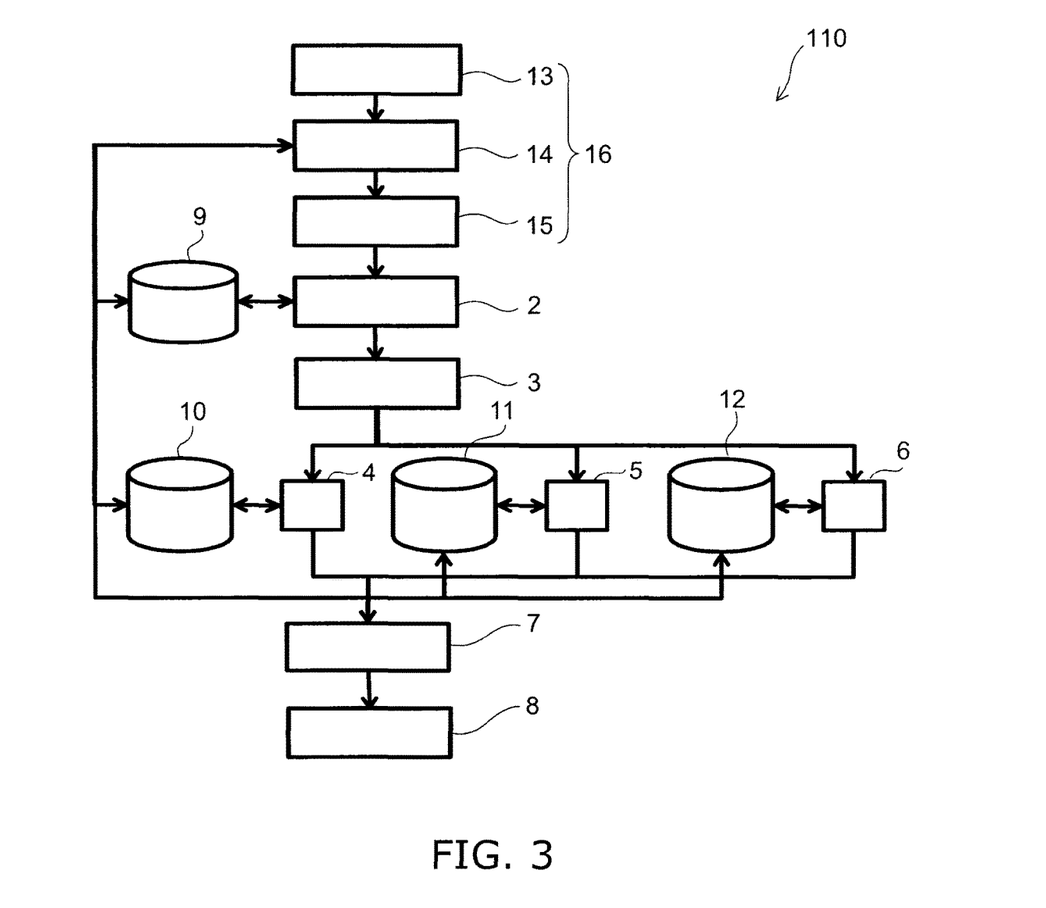
FIG. 3 is a block diagram for illustrating a manufacturing control system 110 according to a second embodiment.

FIG. 3 is a block diagram for illustrating a manufacturing control system 110 according to a second embodiment.

As shown in FIG. 3, the manufacturing control system 110 includes an input unit 16, a reference data creating unit 2, a reference data saving unit 3, a first data extracting unit 4, a second data extracting unit 5, a third data extracting unit 6, a history data creating unit 7, an output unit 8, a data storing unit 9, a first data storing unit 10, a second data storing unit 11, and a third data storing unit 12.

The input unit 16 includes an input condition selecting unit 13, a product data acquiring unit 14, and a product data saving unit 15.

The input condition selecting unit 13 is configured to input data for selecting a target product.

Examples of the data for selecting a target product can include the product type, model number, manufacturing period, parts lot number, and inspection program version.

The input condition selecting unit 13 provides the data for selecting a target product to the product data acquiring unit 14.

The product data acquiring unit 14 acquires data for specifying a target product based on the data for selecting a target product.

The data for specifying a target product are e.g. manufacturing serial numbers or shipping serial numbers stored in the data storing unit 9, the first data storing unit 10, the second data storing unit 11, and the third data storing unit 12.

The product data acquiring unit 14 provides the acquired data for specifying a target product to the product data saving unit 15.

The product data saving unit 15 temporarily saves the data for specifying a target product. Then, on demand, for instance, the product data saving unit 15 provides the data for specifying a target product to the reference data creating unit 2.

The reference data creating unit 2, the reference data saving unit 3, the first data extracting unit 4, the second data extracting unit 5, the third data extracting unit 6, the history data creating unit 7, the output unit 8, the data storing unit 9, the first data storing unit 10, the second data storing unit 11, and the third data storing unit 12 can be made similar to those described above.

Next, the function of the manufacturing control system 110 is illustrated.

For instance, there are cases where products using parts of a particular lot number have a high defective ratio, or products inspected using the inspection program of a particular version have a high defective ratio. In such cases, the lot number or the inspection program version is inputted to the input condition selecting unit 13. The input condition selecting unit 13 provides the inputted data to the product data acquiring unit 14.

The product data acquiring unit 14 acquires data (such as manufacturing serial number and shipping serial number) related to the product using parts of the inputted lot number or the product inspected using the inspection program of the inputted version from the data storing unit 9, the first data storing unit 10, the second data storing unit 11, and the third data storing unit 12. The product data acquiring unit 14 provides the acquired data to the product data saving unit 15.

The product data saving unit 15 temporarily stores the data acquired by the product data acquiring unit 14, and provides the stored data to the reference data creating unit 2.

Thus, products or groups of products likely to be defective can be identified.

In this case, if any of the identified products or groups of products has not been shipped, the shipment can be suspended. This can prevent the occurrence of defectives at the customer site. Furthermore, if any of the identified products or groups of products has been shipped, it is possible to ascertain how many products have been shipped to which customer. Thus, an appropriate countermeasure for that customer can be rapidly planned.

Here, the creation of history data and the like can be made similar to those described above, and hence the detailed description thereof is omitted.

The manufacturing control system 110 according to the embodiment can form a desired time band based on the reference data, and extract the latest data in the formed time band.

Thus, high-efficiency and appropriate manufacturing control can be performed.

Furthermore, products or groups of products likely to be defective can be identified.

Thus, more appropriate manufacturing control can be performed.

[Third Embodiment]

Next, a manufacturing control method according to a third embodiment is illustrated.

As an example, the method is illustrated with reference to the case illustrated in FIG. 2.

Figure 4:
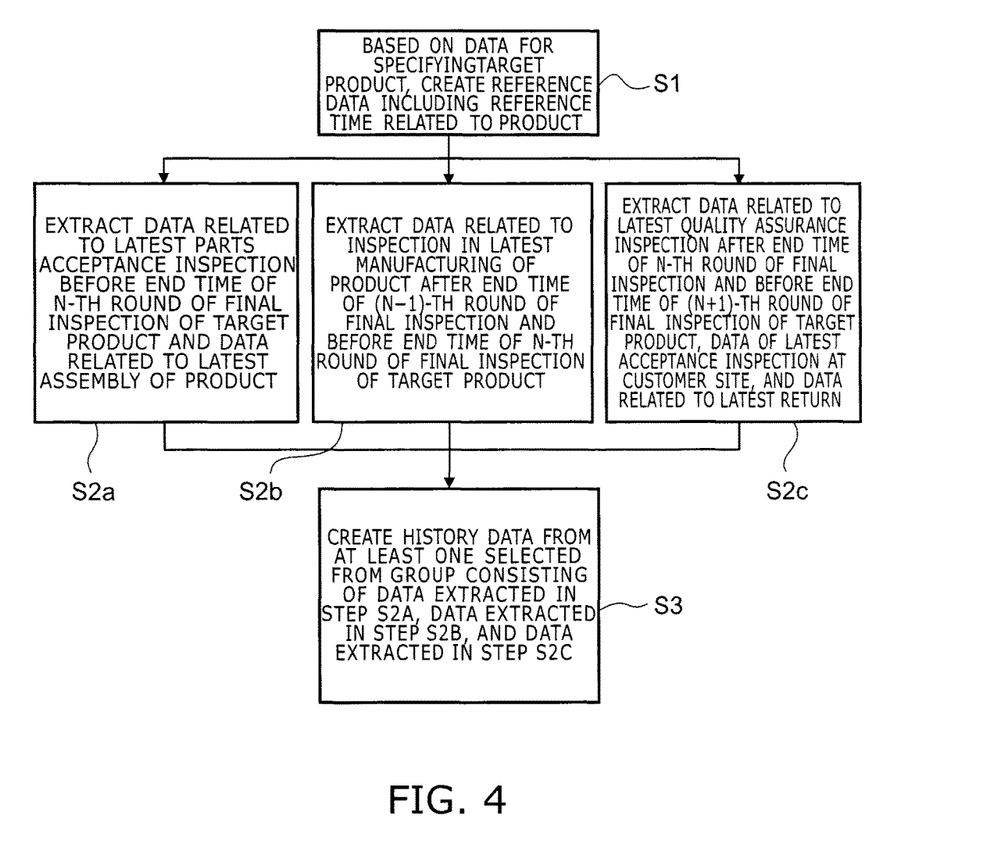
FIG. 4 is a flow chart for illustrating the manufacturing control method according to the third embodiment.

FIG. 4 is a flow chart for illustrating the manufacturing control method according to the third embodiment.

First, based on the data for specifying a target product, reference data including a reference time related to the product are created (step S1).

Next, based on the reference data, data related to the latest parts acceptance inspection before the end time of the N-th round of final inspection of the target product (first time band 51) and data related to the latest assembly of the product are extracted (step S2a).

Furthermore, based on the reference data, data related to inspection in the latest manufacturing of the product after the end time of the (N−1)-th round of final inspection and before the end time of the N-th round of final inspection of the target product (second time band 52) are extracted (step S2b).

Furthermore, based on the reference data, data related to the latest quality assurance inspection after the end time of the N-th round of final inspection and before the end time of the (N+1)-th round of final inspection of the target product (third time band 53), data of the latest acceptance inspection at the customer site, and data related to the latest return are extracted (step S2c).

Next, history data are created from at least one selected from the group consisting of the data extracted in step S2a, the data extracted in step S2b, and the data extracted in step S2c (step S3).

For instance, in identifying e.g. the cause of abnormality in the manufacturing process, in step S2a, data related to the latest parts acceptance inspection in the first time band 51a for N equal to 1 and data related to the latest assembly of the product are extracted.

Furthermore, in step S2b, data related to inspection in the latest manufacturing of the product in the second time band 52a for N equal to 1 are extracted.

Furthermore, in step S2c, data related to the latest quality assurance inspection in the third time band 53a for N equal to 1 are extracted.

Then, in the step of creating history data, history data can be created from these extracted data.

Furthermore, for instance, in identifying e.g. the range of other products affected by the cause of failing the acceptance inspection at the customer site, in step S2a, data related to the latest parts acceptance inspection in the first time band 51b for N equal to 2 and data related to the latest assembly of the product are extracted.

Furthermore, in step S2b, data related to inspection in the latest manufacturing of the product in the second time band 52b for N equal to 2 are extracted.

Furthermore, in step S2c, data related to the latest quality assurance inspection in the third time band 53b for N equal to 2 and data of the latest acceptance inspection at the customer site are extracted.

Then, in the step of creating history data, history data can be created from these extracted data.

Furthermore, for instance, in quality assurance for shipped products, in step S2a, data related to the latest parts acceptance inspection in the first time band 51c for N equal to 3 and data related to the latest assembly of the product are extracted.

Furthermore, in step S2b, data related to inspection in the latest manufacturing of the product in the second time band 52c for N equal to 3 are extracted.

Furthermore, in step S2c, data related to the latest quality assurance inspection in the third time band 53c for N equal to 3 are extracted.

Then, in the step of creating history data, history data can be created from these extracted data.

Besides, arbitrary history data can be created by establishing a time band depending on the purpose and extracting the latest data in the established time band.

Here, the content in each step can be made similar to that described above, and hence the detailed description thereof is omitted.

[Fourth Embodiment]

Next, a manufacturing control program according to a fourth embodiment is described.

The manufacturing control program according to the embodiment can be configured to cause e.g. the manufacturing control system 100 or the manufacturing control system 110 to perform the aforementioned manufacturing control method.

In order to cause a sequence of processing to be performed, a program constituting the software thereof is stored in e.g. a storing unit, not shown, provided in the manufacturing control system 100 or the manufacturing control system 110. The program is supplied to the manufacturing control system 100 or the manufacturing control system 110 in the state of e.g. being stored in a recording medium, not shown. The program is then read and stored in a storing unit, not shown, of the manufacturing control system 100 or the manufacturing control system 110. Here, the program can be stored in the storing unit, not shown, of the manufacturing control system 100 or the manufacturing control system 110 also through communication means and the like.

Then, by executing this program, the aforementioned manufacturing control method is performed in the manufacturing control system 100 or the manufacturing control system 110.

For instance, a computer is caused to execute an operation, based on the data for specifying a target product, for calculating reference data including a reference time related to the product, an operation for extracting data related to the latest parts acceptance inspection before the N-th round of the reference time of the product and data related to the latest assembly of the product, an operation for extracting data related to inspection in the latest manufacturing of the product after the (N−1)-th round of the reference time and before the N-th round of the reference time of the product, and an operation for extracting data related to the latest quality assurance inspection after the N-th round of the reference time and before the (N+1)-th round of the reference time of the product and data of the latest acceptance inspection at the customer site.

Furthermore, other functions illustrated in the manufacturing control system 100, the manufacturing control system 110, and the manufacturing control method described above can also be performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A manufacturing control system comprising:
a reference data creating unit configured to create, based on data for specifying a product, reference data including plural reference times related to the product;
a first data storing unit configured to store data related to parts acceptance inspection and data related to assembly of the product;
a second data storing unit configured to store data related to inspection in manufacturing of the product;
a third data storing unit configured to store data related to quality assurance inspection and data of acceptance inspection at a customer site, the data of the acceptance inspection at the customer site including an inspection time, a pass or fail result, and a customer name;
a first data extracting unit configured to extract data indicating a result of a chronologically last of the parts acceptance inspection in a first time band and data indicating a result of a chronologically last assembly of the product from the data stored in the first data storing unit, the first time band being a period before a first reference time of the product;
a second data extracting unit configured to extract data indicating a result of inspection in a chronologically last manufacturing of the product in a second time band different from the first time band from the data stored in the second data storing unit, the second time band being a period after a second reference time and before the first reference time of the product;
a third data extracting unit configured to extract data indicating a result of a chronologically last of the quality assurance inspection in a third time band different from the first time band and the second time band and data of a chronologically last of the acceptance inspection at the customer site from the data stored in the third data storing unit, the third time band being a period after the first reference time and before a third reference time of the product;
a history data creating unit configured to create and output history data from at least one of the data extracted by the first data extracting unit, the data extracted by the second data extracting unit, and the data extracted by the third data extracting unit; and
at least one external device configured to
identify a cause of abnormality in a manufacturing process using history data output from at least the second data extracting unit based on a correlation analysis between a mode of abnormality and a predetermined failure mode, and
identify pre-shipment products affected by a same cause of abnormality at the customer site using history data output from at least the third data extracting unit based on a correlation analysis between a mode of abnormality and a predetermined failure mode.

2. The system according to claim 1, wherein
the third data storing unit further stores data related to return of the product from the customer site, the product having failed an acceptance inspection at a customer site, and
the third data extracting unit further extracts a chronologically last data related to return in the third time band from the data stored in the third data storing unit.

3. The system according to claim 1, wherein the history data creating unit creates the history data from:
the data indicating a result of the chronologically last parts acceptance inspection and the data indicating a result of the chronologically last assembly of the product extracted by the first data extracting unit;

the data indicating a result of inspection in the chronologically last manufacturing of the product extracted by the second data extracting unit; and the data indicating a result of the chronologically last quality assurance inspection and the data of the chronologically last acceptance inspection at the customer site extracted by the third data extracting unit.

4. The system according to claim 1, wherein the at least one external device is configured to perform quality assurance for the product shipped, and the history data creating unit creates the history data from:

the data indicating a result of the chronologically last parts acceptance inspection and the data indicating a result of the chronologically last assembly of the product extracted by the first data extracting unit;

the data indicating a result of inspection in the chronologically last manufacturing of the product extracted by the second data extracting unit; and the data indicating a result of the chronologically last quality assurance inspection extracted by the third data extracting unit.

5. The system according to claim 1, wherein the plural reference times related to the product are of one type selected from the group consisting of an end time of final inspection, an end time of the quality assurance inspection, a start time of the quality assurance inspection, an end time of the acceptance inspection at the customer site, a start time of the acceptance inspection at the customer site, and a shipping time of the product.

6. The system according to claim 1, further comprising:
an input condition selecting unit configured to input data for selecting the product;
a product data acquiring unit configured to acquire data for specifying the product based on the inputted data for selecting the product; and
a product data saving unit configured to save the acquired data for specifying the product and to provide the saved data for specifying the product to the reference data creating unit.

7. A manufacturing control method comprising:
creating, by a computer, based on data for specifying a product, reference data including plural reference times related to the product;
first storing, by a first data storing unit, data related to parts acceptance inspection and data related to assembly of the product;
second storing, by a second data storing unit, data related to inspection in manufacturing of the product;
third storing, by a third data storing unit, data related to quality assurance inspection and data of acceptance inspection at a customer site, the data of the acceptance inspection at the customer site including an inspection time, a pass or fail result, and a customer name;
a first extracting step configured to extract, by the computer, data indicating a result of a chronologically last parts acceptance inspection in a first time band and data indicating a result of a chronologically last assembly of the product, the first time band being a period before a first reference time of the product;
a second extracting step configured to extract, by the computer, data indicating a result of inspection in a chronologically last manufacturing of the product in a second time band different from the first time band, the second time band being a period after a second reference time and before the first reference time of the product; and a third extracting step configured to extract, by the computer, data indicating a result of a chronologically last quality assurance inspection in a third time band different from the first time band and the second time band and data of a chronologically last acceptance inspection at a customer site, the third time band being a period after the first reference time and before a third reference time of the product;

creating and outputting, by the computer, history data from at least one of the data extracted in the first extracting step, the data extracted in the second extracting step, and the data extracted in the third extracting step;

identifying a cause of abnormality in a manufacturing process using history data output from at least the second extracting step based on a correlation analysis between a mode of abnormality and a predetermined failure mode; and identifying pre-shipment products affected by a same cause of abnormality at the customer site using history data output from at least the third extracting step based on a correlation analysis between a mode of abnormality and a predetermined failure mode.

8. The method according to claim 7, wherein in the third extracting step, data related to a chronologically last return of the product having failed an acceptance inspection at a customer site is further extracted.

9. The method according to claim 7, further comprising identifying products affected by a cause of failing an acceptance inspection at the customer site, and the creating history data creates the history data from:

the data indicating a result of the chronologically last parts acceptance inspection and the data indicating a result of the chronologically last assembly of the product extracted in the first extracting step;

the data indicating a result of inspection in the chronologically last manufacturing of the product extracted in the second extracting step; and the data indicating a result of the chronologically last quality assurance inspection and the data of the chronologically last acceptance inspection at the customer site extracted in the third extracting step.

10. The method according to claim 7, further comprising identifying a cause of abnormality in a manufacturing process, and the creating history data creates the history data from:

the data indicating a result of the chronologically last parts acceptance inspection and the data indicating a result of the chronologically last assembly of the product extracted in the first extracting step;

the data indicating a result of inspection in the chronologically last manufacturing of the product extracted in the second extracting step; and the data indicating a result of the chronologically last quality assurance inspection extracted in the third extracting step.

11. The method according to claim 7, further comprising performing quality assurance for the product shipped, and the creating history data creates the history data from:

the data indicating a result of the chronologically last parts acceptance inspection and the data indicating a result of the chronologically last assembly of the product extracted in the first extracting step;

the data indicating a result of inspection in the chronologically last manufacturing of the product extracted in the second extracting step; and the data indicating a result of the chronologically last quality assurance inspection extracted in the third extracting step.

12. The method according to claim 7, wherein when an abnormality occurs, the cause of abnormality in the manufacturing process is further identified using, history data including, in the raw proportion, data related to passing and data related to failing based on the cause of abnormality in the manufacturing process; and the pre-shipment products affected by a same cause of abnormality at the customer site are further identified using history data being data immediately before shipment and including a cause of the abnormality at the customer site.

13. A non-transitory computer-readable storage medium storing computer-readable instructions thereon, which, when executed by a computer, cause the computer to perform manufacturing control method comprising:

an operation configured to create, based on data for specifying a product, reference data including plural reference times related to the product;

first storing, by a first data storing unit, data related to parts acceptance inspection and data related to assembly of the product;

second storing, by a second data storing unit, data related to inspection in manufacturing of the product;

third storing, by a third data storing unit, data related to quality assurance inspection and data of acceptance inspection at a customer site, the data of the acceptance inspection at the customer site including an inspection time, a pass or fail result, and a customer name;

an operation configured to extract data indicating a result of a chronologically last parts acceptance inspection in a first time band and data indicating a result of a chronologically last assembly of the product, the first time band being a period before a first reference time of the product;

an operation configured to extract data indicating a result of inspection in a chronologically last manufacturing of the product in a second time band different from the first time band, the second time band being a period after a second reference time and before the first reference time of the product; and an operation configured to extract data indicating a result of a chronologically last quality assurance inspection in a third time band different from the first time band and the second time band and data of a chronologically last acceptance inspection at a customer site, the third time band being a period after the first reference time and before a third reference time of the product;

an operation configured to output history data from at least one of the extracted data indicating a result of the chronologically last parts acceptance inspection in the first time band, the extracted data indicating a result of the chronologically last assembly of the product, the extracted data indicating a result of the inspection in the chronologically last manufacturing of the product in the second time band, the extracted data indicating a result of the chronologically last quality assurance inspection in the third time band, and the extracted data of the chronologically last acceptance inspection at the customer side; and identifying a cause of abnormality in a manufacturing process using history data output based on at least the second time band based on a correlation analysis between a mode of abnormality and a predetermined failure mode; and identifying pre-shipment products affected by a same cause of abnormality at the customer site using history data output based on at least the third time band based on a correlation analysis between a mode of abnormality and a predetermined failure mode.

14. The non-transitory computer-readable storage medium according to claim 13, further comprising:

an operation configured to extract data related to a chronologically last return of the product having failed an acceptance inspection at a customer site in the third time band.

15. The non-transitory computer-readable storage medium according to claim 13, further comprising identifying products affected by a cause of failing an acceptance inspection at the customer site, and the history data are calculated from the extracted data indicating a result of the chronologically last parts acceptance inspection, the extracted data indicating a result of the chronologically last assembly of the product, the extracted data indicating a result of the inspection in the chronologically last manufacturing of the product, the extracted data indicating a result of the chronologically last quality assurance inspection, and the extracted data of the chronologically last acceptance inspection at the customer site.

16. The non-transitory computer-readable storage medium according to claim 13, further comprising identifying a cause of abnormality in a manufacturing process, and the history data are calculated from the extracted data indicating a result of the chronologically last parts acceptance inspection, the extracted data indicating a result of the chronologically last assembly of the product, the extracted data indicating a result of the inspection in the chronologically last manufacturing of the product, and the extracted data indicating a result of the chronologically last quality assurance inspection.

17. The non-transitory computer-readable storage medium according to claim 13, further comprising performing quality assurance for the product shipped, and the history data are calculated from the extracted data indicating a result of the chronologically last parts acceptance inspection, the extracted data indicating a result of the chronologically last assembly of the product, the extracted data indicating a result of the inspection in the chronologically last manufacturing of the product, and the extracted data indicating a result of the chronologically last quality assurance.

* * * * *